May 20, 1930.  B. G. BJORNSON  1,759,604
INDICATING DEVICE
Filed Oct. 30, 1926

Inventor:
Bjorn G. Bjornson.
by
E. V. Griggs Attorney.

Patented May 20, 1930

1,759,604

UNITED STATES PATENT OFFICE

BJORN G. BJORNSON, OF NEW YORK, N. Y., ASSIGNOR TO BELL TELEPHONE LABORATORIES INCORPORATED, OF NEW YORK, N. Y., A CORPORATION OF NEW YORK

INDICATING DEVICE

Application filed October 30, 1926. Serial No. 145,296.

This invention relates to indicating devices and particularly to devices for producing a visual indication of variations in the voltage, current or power in an electric circuit.

In an electrical indicating system wherein a plurality of neon tubes are arranged to glow in sequence as the voltage or power on the line or current therein is increased, it is essential that the tubes commence to glow at predetermined voltages. Considerable variations occur in the glow voltages of different tubes of the same type, and also the glow voltage of a given tube may vary from time to time.

It is an object of this invention to compensate for such variations.

In the indicating system of the present invention this object is attained by providing a calibrating and adjusting circuit for each tube, whereby from time to time tests may be made and adjustments effected, if necessary. In the preferred embodiment of the invention the line voltages act through transformers and vacuum tube amplifiers to cause the discharge of the neon tubes. In order that the same type of neon tube may be used to indicate the different line voltages, the largest amplification is provided for the lowest line voltage to be indicated and successively reduced amplifications for successive increases in line voltage. The stepped up voltages may be applied to the tubes through either a multi-ratio transformer or potentiometers. The circuit of each tube is provided with an adjustable potentiometer, which may be so adjusted that each tube will glow when a given voltage is impressed upon the several circuits. A source of direct current is used for calibrating, which source is preferably the plate battery of the amplifiers, where vacuum tube amplifiers are employed, since its use for calibrating insures that the amplifiers are disabled during the calibration period.

In the preferred arrangement two stages of amplification are employed, both stages being used for the lower line voltages and one only for the higher voltages. Excessive overloading of the neon tubes used for indicating the lower line voltages is prevented by causing the second stage amplifier to saturate at the higher line voltages.

Figure 1:
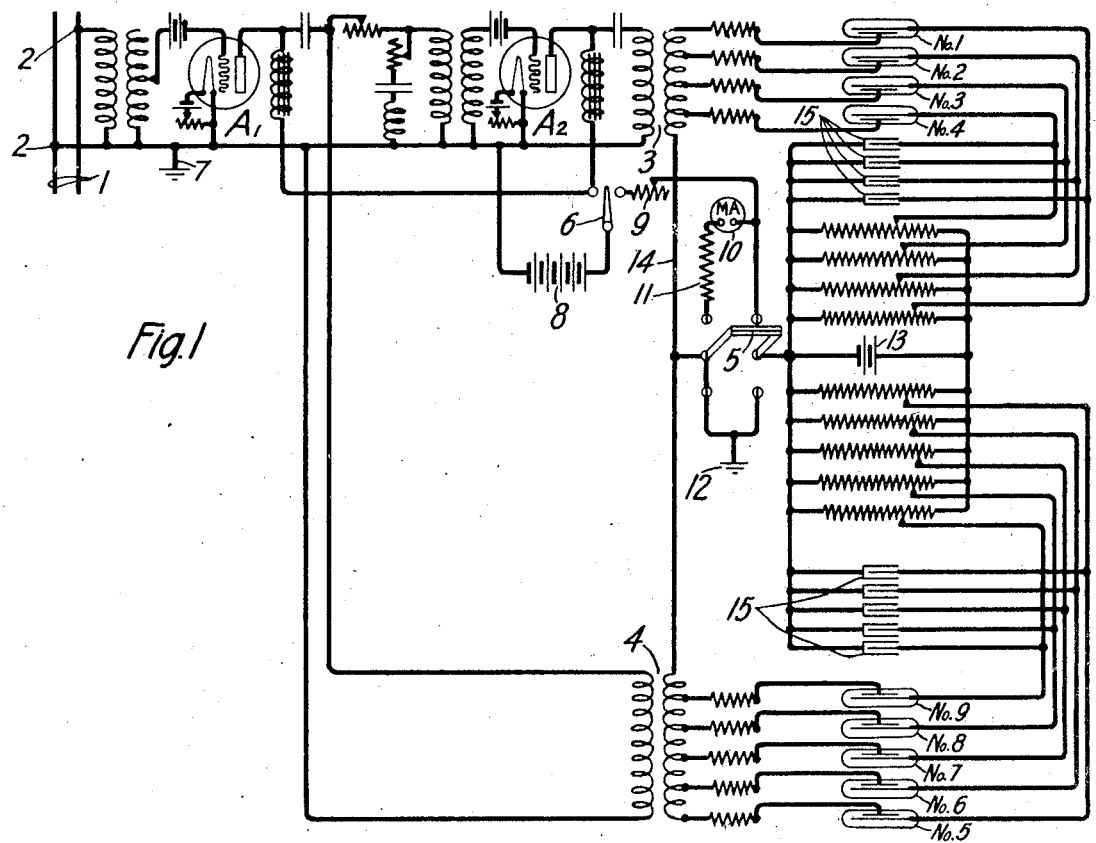
Figure 2:
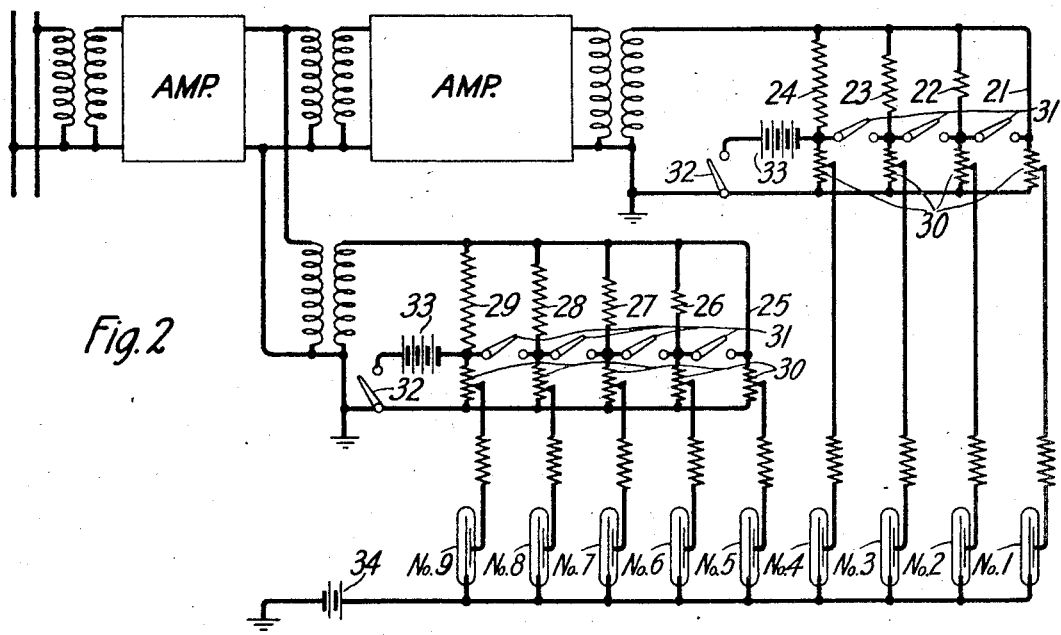

A better understanding of the invention may be had from the following detailed description when read in connection with the accompanying drawing in which:

Fig. 1 shows a schematic circuit arrangement for indicating in a series of steps the line voltage as it increases in intensity in excess of the predetermined level, and Fig. 2 shows a modification of the circuit of Fig. 1.

In reference to the drawing, line 1 represents a transmission circuit such as a telephone line. It is understood, of course, that this representation is not intended to constitute a limitation of the invention, but that the indicating system of the invention may be applied to other classes of circuits, such as power, signaling and those used in connection with apparatus at broadcasting stations. Bridged across the line 1 at points 2—2, which may be either the terminals at one end of the line or points along the line between terminals, is the apparatus for indicating the voltage upon the line, or the power or current therein.

As neon tubes are usually designed to discharge, or break down, at much higher voltages than those usually encountered in low energy lines, it is necessary to provide amplification between input terminals 2—2 and the neon tubes. Amplifiers $A_1$ and $A_2$ and transformers 3 and 4 are therefore furnished to step up the alternating current voltage on the line to a point where the tubes will discharge. If the tubes had no inherent defects the line voltage could be stepped up to the exact breakdown voltage, but because of the variation in the breakdown voltages in commercial tubes, it may be necessary to insert a biasing battery in the tube circuits. With the aid of potentiometers and a high voltage battery, the tube circuits may be adjusted so that all the tubes will discharge at one and the same voltage. To provide means for indicating the energy on the line, over wide ranges, say forty transmission units (TU) and over, several neon tubes may be used so that the voltage of an impulse on the line as it increases in intensity, may be indicated in regular steps, the tubes breaking down in succession as the line voltage rises to the corresponding step or level. It will be assumed herein that the energy difference between the several levels to be indicated is 6 TU.

In the circuit of Fig. 1 neon tubes, Nos. 1 to 9, are used for indicating the energy of an impulse in uniform steps, as it increases in intensity over a wide range on line 1. Thus, when the impulse reaches a certain energy level, tube No. 1 will be seen to light up and as the energy increases in steps, say of 6 TU each, one tube after another will be seen to light up in sequence. There is substantially no lag in the indicating circuit and therefore the tubes light up instantaneously.

Before describing the operation of the device it will be necessary to describe how the tube circuits are adjusted to compensate for any variations in the glow voltages of the several tubes so that the tubes will discharge at the one voltage. In order to arrange for such adjustment switches 5 and 6 are provided so that the device may be set for either calibration or operation. When it is desired to set the device for calibration, switch 6 is moved, according to the drawing, to its right hand contact and switch 5 is moved to its "up" position, and when it is desired to set the device for operation, the switches are moved to their opposite positions. With the calibrating circuit thus closed it may be traced from the ground connection 7, battery 8, switch 6, variable resistance 9, milliameter 10, resistance 11, left hand contact of switch 5 to ground connection 12. Battery 8 is shown as the "B" battery of amplifiers $A_1$ and $A_2$. A lower voltage battery may be used, in which case, the resistances 9 and 11 would not be necessary. However, the use of the "B" battery is a more economical arrangement and the calibrating voltage for the tubes Nos. 1 and 9 may be obtained from the potential drop across resistance 11. The calibrating voltage is impressed on circuits extending respectively through tubes Nos. 1 to 9, and included in each circuit for the purpose of adjustment thereof is a potentiometer which may be set in a position individual to its respective circuit, so that all the tubes will glow at a common potential. Battery 13 may be inserted across the potentiometers as shown for the purpose of biasing the tubes to discharge at a lower potential across the fixed resistance 11. The potentiometers, therefore, compensate for any variations in the glowing potentials of the tubes and in this way the tubes are calibrated to overcome their inherent defects and discharge at one and the same voltage. The amount of current required to effect the discharge in the tube is negligible. In order to avoid tracing the calibrating circuits for tubes 1 to 4 individually, it may be stated that their paths are similar and that the circuit for tube No. 1 may be selected as representative of the others. The circuit for tube No. 1 may be traced from left hand contact of switch 5, conductor 14, secondary winding of transformer 3 and the uppermost tap thereon, resistance between the uppermost tap and tube No. 1, tube No. 1, potentiometer for tube No. 1, right hand contacts of switch 5, milliameter 10, resistance 11, and left hand contact of switch 5, and the calibrating voltage for this circuit is obtained across resistance 11. The secondary windings of transformers 3 and 4 are each divided into sections by taps through which the tube circuits are respectively connected, tube No. 1 being connected to the uppermost tap of the secondary winding of transformer 3. The calibrating circuits for tubes Nos. 5 to 9 are traced in the manner similar to that for tube No. 1, except that the secondary winding of transformer 4 is used instead of that of transformer 3. Milliameter 10 is provided for the purpose of indicating the current flow from battery 8, and this current may be regulated by means of variable resistance 9. After the potentiometers are adjusted, so that all of the tubes glow at the one potential and it is desired to arrange the tubes for operation with the line 1, switch 6 is moved to its operating, or left hand, contact and switch 5 is moved to its operating, or "down", position.

Let it be assumed that an alternating current impulse, slowly rising in intensity, is impressed on the line 1, and it reaches the input terminals 2—2 which is the point where it is desired to measure the energy on the line. This impulse is first impressed upon amplifier $A_1$ across the input transformer therefor and is repeated by that amplifier. A portion of the energy output of amplifier $A_1$ is impressed on the input circuit of amplifier $A_2$ and a portion upon the primary winding of transformer 4. If the voltage impressed on the input circuit of amplifier $A_2$ is equal to or less than that required to cause saturation of amplifier $A_2$ (the saturation point of amplifier $A_2$ being higher than that of amplifier $A_1$), the portion impressed on the input circuit of amplifier $A_2$ will be repeated thereby. The amplified output of amplifier $A_2$ is impressed upon the indicating circuit by the step-up transformer 3 and causes the discharge of one or more of the neon tubes 1 to 4 depending on the value of the voltage induced in the secondary winding of transformer 3, which in turn is proportional to the line voltage on the line across terminals 2—2. The proper tubes will light up, giving an indication of the voltage on the line or the power or current therein.

If the line voltage at any time is such as to make the level of the energy output of amplifier tube $A_1$ above a predetermined value, which value is determined by the saturation point of amplifier $A_2$, then the portion of the energy impressed upon the input circuits of neon tubes 5 to 9 by the transformer 4 will be such as to cause the discharge of one or more of these tubes depending on the value of the voltage induced in the secondary winding of transformer 4. The portion of the energy output of amplifier tube $A_1$ impressed on the input circuit of amplifier tube $A_2$, which is greater than the amount required to cause saturation of the latter amplifier tube, is not repeated thereby, and, therefore, the neon tubes 1 to 4 which are already in an incandescent condition, are protected from the excess energy.

By using transformers having taps taken off the secondary windings at several points and connected to several tubes, respectively, it is possible to vary the transformed voltage for each tube so connected. Tube No. 1 is connected to the uppermost tap of transformer 3 and will, therefore, receive practically the full stepped up voltage; tube No. 2 will receive less; tube No. 3 still less; and tube No. 4 the least. On transformer 4, tube No. 5 is connected to the lowermost tap and, like tube No. 1, receives the full stepped up voltage, but for a given line voltage this voltage is less than that in transformer 3 because only one stage of amplification is used. Tubes Nos. 6, 7, 8 and 9, being connected to different taps on the secondary winding of transformer 4, will accordingly receive voltages of less value than that received by tube No. 5. The number of turns between taps on the secondary windings determine the number of transmission units between the energy levels at which indication is desired and, if the difference between the various levels is 6 TU, as hereinbefore assumed, and the tubes are calibrated to discharge exactly at a definite voltage, say 100 volts, then each line voltage level will bear an approximately fixed ratio to a succeeding level. For example, if the predetermined line voltage level at which tube No. 1 is calibrated to discharge is .03 volt, the successive levels to which the line voltage must rise in order to effect a discharge in tubes Nos. 2 to 9 successively will be at approximately .06 volt, 0.12 volt, 0.24 volt, 0.48 volt, 0.96 volt, 1.92 volts, 3.84 volts and 7.68 volts, respectively, thereby fixing a ratio of approximately 1 to 2. The circuit for the alternating current induced in the secondary winding of transformer 3 and transmitted with just sufficient voltage to cause a discharge in tube No. 1, may be traced from ground 12, left contact of switch 5, the uppermost tap of the secondary winding of transformer 3, through resistance for tube No. 1, tube No. 1 and its associated condenser 15, right contact of switch 5 in its "down" position to ground 12. When the line voltage increases to the second level, that is, .06 volt, which produces a volume range of 6 TU, the voltage is sufficient to effect the discharge of tube No. 2 in a circuit which may be traced over a path similar to that of tube No. 1 except that it is taken off at the tap associated with tube No. 2. The circuits for the remaining tubes may be traced over similar paths except that they are taken off at their respective taps. As the line voltage increases in intensity over the various levels at which the tubes will discharge, the volume of energy increases in steps of 6 TU, thereby providing a system in which the volume of energy on a line will be indicated in successive and uniform steps as the voltage on the line rises above a predetermined level.

When an impulse on the line rises to such a point that it causes to be impressed on a tube a potential equal to the glowing potential of that tube thereby effecting a glow in the tube, the impedance in the operating circuit of such tube and also the impedance in the operating circuits for the tubes arranged for subsequent operation as the line voltage rises, undergo changes and continue to change as the higher potentials cause the remaining tubes to discharge successively. These changes in impedance and consequent changes in the step-up ratios of the transformers are taken care of by properly spacing the taps on the secondary windings and can be calculated beforehand with sufficient accuracy to properly design the transformers. In order that the potentiometers, one of which is provided for each of the tube circuits and arranged in a path provided for the direct current components of the alternating current voltages received from the line, shall not introduce unknown impedance of sufficient magnitude to affect the transformer ratios, they are shunted by individual condensers so as to provide separate paths for the glowing alternating current potentials. In this way the impedance of the alternating current paths is maintained constant regardless of the adjustments on the potentiometers.

The minimum energy level at which the first tube will discharge is set at some predetermined voltage and the maximum level is determined by the saturation of the amplifiers $A_1$ and $A_2$ and the stepped up voltage obtainable in the transformers 3 and 4. Inasmuch as the tubes are arranged to glow at energy levels of 6 TU, the arrangement of nine tubes shown in the drawing, will provide a system having a volume range of 48 TU, tube No. 1 being regarded as the indicator of the starting, or zero, level.

In the modified system shown in Fig. 2 the principle involved is substantially the same as that described above for Fig. 1, except that other means are used for determining the transmission levels at which the tubes will discharge and the adjustment for the variations in the glowing potentials of the tubes is accomplished by a different method. In order to obtain the desired steps in transmission levels (assumed in Fig. 1 to be 6 TU) the circuits of tubes Nos. 1 to 9 are each provided with a fixed resistance, no two resistances being alike, and the proper selection of these resistances, designated Nos. 21 to 29 on the drawing, furnish the desired voltages required in the respective circuits, as was accomplished in Fig. 1 by a series of taps on the transformers. The system is arranged for calibration by closing switches 31 and 32 and the calibrating circuit for each tube is thus completed and may be traced from calibrating battery 33, through its respective switch 31 and potentiometer 30 and switch 32 back to battery 33. By means of the potentiometers the tube circuits may then be adjusted by selecting a point on each potentiometer which will give sufficient voltage to effect a discharge in its associated tube, thereby providing an indicating system in which the tubes have a common glowing potential. The biasing battery 34 may be used if it is desired to lower the glowing potentials of the tubes.

The neon tubes 1 to 9 in the circuits of Figs. 1 and 2 described above may be provided with any desired scale, that is, the scales thereon may be such as to give a direct indication of the actual line voltage, line power or current, or any desired proportion thereof. These scales thereon may be uniform, or if it is desired to obtain an indication of the line voltage, power or current, over a certain range more accurately than over another range, it may be desirable to make these scales non-uniform.

What is claimed is:

1. In an indicating system, a line for transmitting electric currents supplied from a variable source of voltage, a plurality of indicating means, means independent of said line for calibrating said indicating means and adjusting them to operate simultaneously at a common predetermined voltage, and other means responsive to the current in said line for causing said indicating means to operate successively to indicate variations in the voltage on said line.

2. In an indicating system, a line for transmitting electric currents and supplied from a variable source of voltage, a plurality of circuits including glow discharge devices arranged to discharge successively at different line voltages, a local calibrating circuit independent of said line and comprising a source of calibrating potential, switching means for connecting said circuits in parallel to said source of calibrating potential, means in said parallel paths for adjusting said tubes to discharge at a common predetermined voltage, and means depending upon said line for effecting the discharge of said tubes successively when the voltage on said line varies, the discharge of each tube representing an increase over the previous value of the line voltage of a certain amount.

3. In an indicating system, a line for transmitting electric currents and supplied from a variable source of voltage, a plurality of circuits including neon tubes arranged to discharge successively at different line voltages, a local calibrating circuit independent of said line and including a source of calibrating potential, switching means for connecting said circuits in parallel to said source of calibrating potential, means in said parallel paths for adjusting said tubes to discharge at a common predetermined voltage, and means responsive to the current in said line for effecting the discharge of said tubes successively when the voltage on said line varies so that the discharge of each tube corresponds to an increase of a different amount in the line voltage over a predetermined value.

4. In an indicating means, a line for transmitting alternating currents and supplied from a variable source of voltage, a plurality of neon tubes, circuits for said tubes, individual means for adjusting said tubes to discharge at a common predetermined voltage, means for stepping-up the voltage on said line to discharge the first of said tubes and to effect the discharge of the other tubes successively as the line voltage increases, and means for preventing the adjusting means from introducing variations in the impedance of said circuits of sufficient magnitude to affect the proper operation of said circuits.

5. In an indicating system, a line for transmitting alternating current and supplied from a source of voltage subject to variation, a plurality of neon tubes, circuits for said tubes each circuit including a shunting path for the tube, individual means in the shunting path for adjusting said tubes to discharge at a common predetermined voltage, means for stepping-up the voltage on said line to discharge the first of said tubes and to effect the discharge of the other tubes successively as the line voltage increases, and means for maintaining during the operation of said tubes, a substantially constant impedance in each shunting path regardless of the adjustment of said adjusting means.

6. In an indicating system, a line for transmitting alternating currents supplied from a variable source of voltage, a plurality of neon tubes, circuits for said tubes each circuit including a shunting path for the tube, individual means in the shunting path for adjusting said tubes to discharge at a common predetermined voltage, means for stepping-up the voltage on said line to discharge the first of said tubes and to effect the discharge of the other tubes successively as the line voltage increases, and a condenser shunting the individual adjusting means in each tube circuit for maintaining during the operation of said tubes a substantially constant impedance in said shunting paths regardless of the adjustment of said adjusting means.

7. In an indicating system, a line for transmitting electric currents and supplied from a variable source of voltage, a plurality of neon tubes, a source of direct current potential independent of said line, a potentiometer associated with each of said tubes, switching means for connecting said source of direct current potential with said potentiometers for calibrating said tubes to discharge at a common predetermined voltage, and a transformer for stepping-up the voltage on said line to discharge the first of said tubes and to effect the discharge of the other tubes successively as the voltage on said line increases.

8. In an indicating system, an alternating current transmission line supplied from a variable source of voltage, a plurality of neon tubes with individual circuit connections for causing them to discharge successively for different voltages applied to said circuit connections, calibrating means for fixing a common predetermined voltage at which said tubes will discharge and a transformer for stepping up said line voltages and applying them to said circuit connections, said transformer having a secondary winding divided into sections by said circuit connections so as to supply different voltages to said tubes, the tubes discharging successively when the voltage at each connection rises in accordance with the line voltage to the common voltage fixed by said calibrating means.

9. In an indicating system, an alternating current transmission line supplied from a variable source of voltage, a plurality of neon tubes for indicating successively the variations in the line voltage as such voltage increases in predetermined steps, individual circuits for said tubes, calibrating means for adjusting said tubes to discharge at a common potential, a plurality of amplifiers each arranged to saturate for different values of applied voltage, for amplifying the line voltages of values below their respective saturation points, and a transformer associated with each of said amplifiers for increasing the amplified voltages to said common discharge potential, the secondary windings of said transformers having taps thereon for connecting said circuits individually to select a different stepped-up line potential for each of said tubes.

In witness whereof, I hereunto subscribe my name this 29th day of October A. D., 1926.

BJORN G. BJORNSON.